(12) United States Patent
Beierl et al.

(10) Patent No.: US 9,096,279 B2
(45) Date of Patent: Aug. 4, 2015

(54) AIR-GUIDING DEVICE FOR A VEHICLE

(71) Applicant: Dr. Ing. h.c. F. Porsche Aktiengesellschaft, Stuttgart (DE)

(72) Inventors: Dominik Beierl, Korntal-Muechingen (DE); Joachim Paul, Stuttgart (DE); Jochem Meder, Weissach (DE); Frank Neubrand, Weil der Stadt (DE); Haiko Neher, Sachsenheim (DE); Waldemar Ruff, Kornwestheim (DE); Roi Nunez Millan, Waldenbuch (ES)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/485,894

(22) Filed: Sep. 15, 2014

(65) Prior Publication Data
US 2015/0076859 A1 Mar. 19, 2015

(30) Foreign Application Priority Data
Sep. 19, 2013 (DE) .......................... 10 2013 110 363

(51) Int. Cl.
*B62D 35/00* (2006.01)
(52) U.S. Cl.
CPC ................... *B62D 35/007* (2013.01)
(58) Field of Classification Search
CPC .................................................. B62D 35/007
See application file for complete search history.

(56) References Cited

U.S. PATENT DOCUMENTS

| | | | | | |
|---|---|---|---|---|---|
| 4,773,692 | A | * | 9/1988 | Schleicher et al. | 296/180.5 |
| 4,925,236 | A | * | 5/1990 | Itoh et al. | 296/180.5 |
| 5,013,081 | A | * | 5/1991 | Cronce et al. | 296/180.1 |
| 5,120,105 | A | * | 6/1992 | Brin et al. | 296/180.5 |
| 5,923,245 | A | * | 7/1999 | Klatt et al. | 340/479 |
| 6,378,932 | B1 | * | 4/2002 | Fasel et al. | 296/180.5 |
| 6,382,708 | B1 | * | 5/2002 | Erdelitsch et al. | 296/180.5 |
| 6,672,651 | B1 | * | 1/2004 | Shuen | 296/180.5 |
| 7,150,494 | B2 | | 12/2006 | Bangle et al. | |
| 7,387,331 | B2 | | 6/2008 | Froeschle et al. | |
| 7,625,035 | B2 | * | 12/2009 | Vlahovic | 296/180.5 |
| 8,226,153 | B2 | * | 7/2012 | Molnar et al. | 296/180.1 |
| 2004/0119319 | A1 | * | 6/2004 | Reiman et al. | 296/180.1 |
| 2007/0001482 | A1 | * | 1/2007 | Larson | 296/180.5 |

\* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A rear region of a vehicle has an air-guiding device (10) with a mounting element (11) for the air-guiding device on the vehicle, and with at least one air-guiding element (13) that is shiftable between a retracted inoperative position and an extended operating position. A gap (14) is formed between the air-guiding element (13) and the mounting element (11) when the air guiding device (10) is in the extended operating position. However, the gap (14) can be closed via a closure device (15). The closure device (15) has a multi-layered, flexible sheetlike structure (16) with at least one front outer, flexible layer (17) and a rear outer, flexible layer (18). In the extended operating position, the front outer layer (17) can be stretched with the aid of a stiff clamping element (19) and the rear outer layer (19) can be stretched with the aid of a flexible clamping element (20).

13 Claims, 4 Drawing Sheets

AIR-GUIDING DEVICE FOR A VEHICLE

CROSS REFERENCE TO RELATED APPLICATION

This application claims priority under 35 U.S.C. 119 to German Patent Application No. 10 2013 110 363.4 filed Sep. 19, 2013, the entire disclosure of which is incorporated herein by reference.

BACKGROUND

1. Field of the Invention

The invention relates to an air-guiding device for a vehicle.

2. Description of the Related Art

U.S. Pat. No. 7,387,331 discloses an air-guiding device for a rear region of a vehicle. The air-guiding device has at least one air-guiding element that can be shifted from a retracted inoperative position into an extended operating position. The air-guiding device known from the prior art has a plurality of air-guiding elements, namely a central main air-guiding element and lateral additional air-guiding elements that can be shifted together with the main air-guiding element. An interspace is formed between a body part and a front end of the main air-guiding element as the central main air-guiding element is shifted from the inoperative position into the operating position. The interspace can be closed by a closure element or a closure device. The closure element can be a flexible closure strip made from a textile material or a rubbery material.

An improved air-guiding device for a vehicle is desired for more effectively closing the gap between the air-guiding element and the rear region of the vehicle when the air-guiding device is in the operating position.

It is the object of the invention to provide a novel air-guiding device for a vehicle.

SUMMARY OF THE INVENTION

The invention relates to a closure device that closes a gap that forms between at least one air-guiding element and a mounting element or rear region of the vehicle when the air-guiding device is in the extended operating position. The closure device may have a multi-layered, flexible sheetlike structure with at least one front outer, flexible layer and a rear outer, flexible layer. In the extended operating position, the front outer layer can be stretched with the aid of a stiff clamping element and the rear outer layer can be stretched with the aid of a flexible clamping element.

The closure device of the invention permits effective closure of a gap that forms between the at least one air-guiding element and the mounting element or the rear region of the vehicle in the extended operating position. The flexible sheetlike structure with at least two layers can be stretched in a simple manner via the clamping elements in the extended operating position and, in the retracted inoperative position, can be deposited in a space-saving manner between each air-guiding element and the mounting element.

The stiff clamping element may be a clamping bow with lateral limbs and a connecting limb that extends between the lateral limbs. Free ends of lateral limbs are articulated to the mounting support. The connecting limb extends between the lateral limbs and is connected to the front outer layer of the sheetlike structure. The front outer layer of the sheetlike structure may be connected to the air-guiding element or one of the air-guiding elements, and to the mounting element.

The fixed clamping element permits a simple and effective clamping of the front outer layer of the sheetlike structure in the extended operating position of the air-guiding device or in the extended operating position of the at least one air-guiding element.

The flexible clamping element is connected to the rear outer layer of the sheetlike structure. The rear outer layer preferably is connected to the at least air-guiding element and to the mounting element or the front outer layer. The flexible clamping element permits effective and simple stretching of the rear outer layer of the flexible sheetlike structure in the extended operating position of the air-guiding device.

The front outer layer of the sheetlike structure extends in the transverse direction of the air-guiding device and therefore in the transverse direction of a vehicle, and is on the inside between covering elements for subassemblies of a shifting device of the air-guiding element. Stiff closure elements of the closure device are positioned laterally on the outside next to the covering elements. The rear outer layer preferably also extends in the transverse direction over the region of the stiff closure elements. The rear outer layer is connected to the stiff closure elements. The gap that forms in the extended operating position of the air-guiding device or the interspace that forms therefore can be covered or closed effectively over the entire transverse direction.

The mounting support may have air passage openings and spacers in the region of the air passage openings. In the retracted inoperative position, the front outer layer of the sheetlike structure comes to bear in sections against the spacers, with a defined gap being formed between the layer and the air passage openings. Therefore, even in the retracted inoperative position, air can flow through the air passage openings in the mounting support of the air-guiding device.

Exemplary embodiments of the invention, without being restricted thereto, are explained in more detail with reference to the drawing.

DETAILED DESCRIPTION

Figure 1:
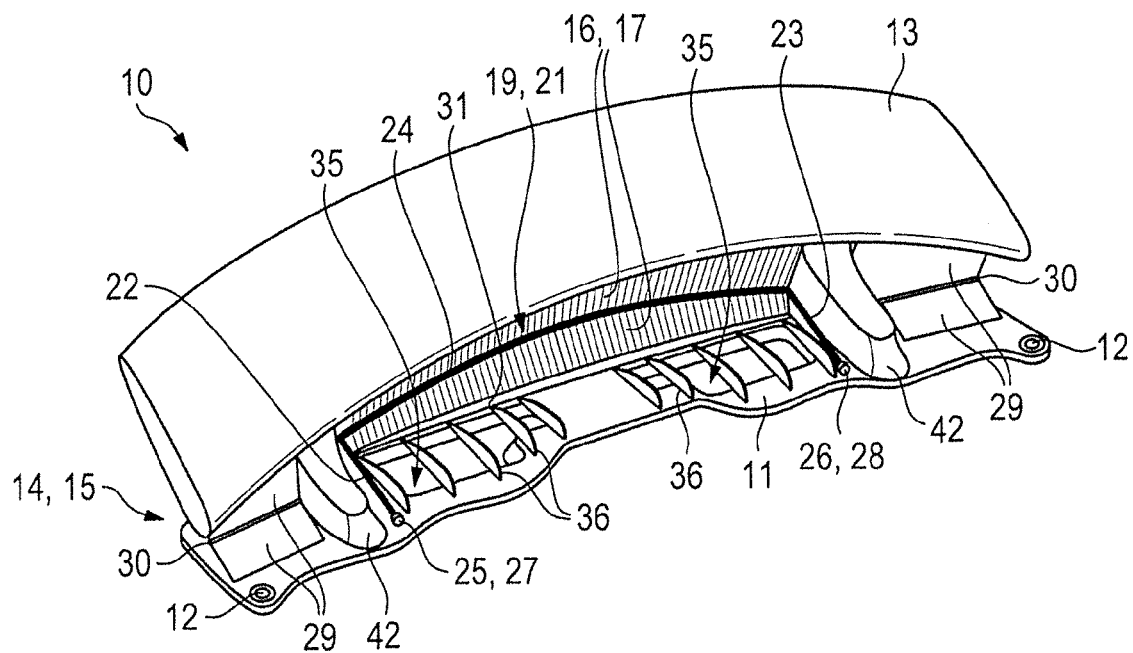
FIG. 1 is a perspective view from the front of an air-guiding device according to the invention for a vehicle.
Figure 2:
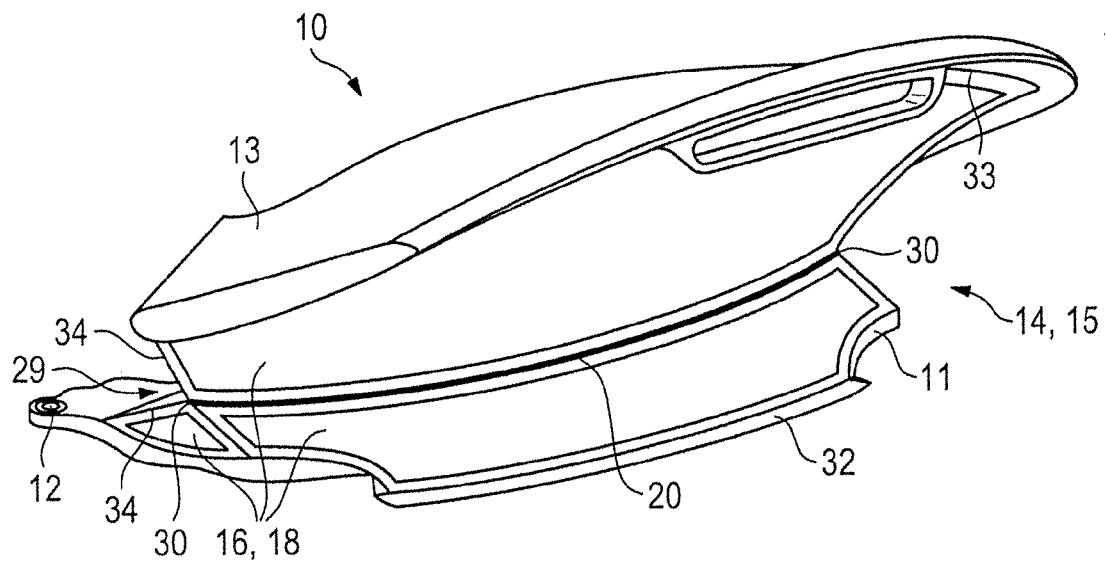
FIG. 2 is a perspective view from the rear of the air-guiding device of FIG. 1.

An air-guiding device in accordance with the invention is identified generally by the numeral 10 in FIGS. 1 and 2 and comprises a mounting element 11 for fastening the air-guiding device 10 to a body structure in a rear region of the vehicle. The air-guiding device 10 preferably is mounted on the body structure of the motor vehicle via screws (not shown) that extend through corresponding openings 12 in the mounting element 11.

Figure 4:
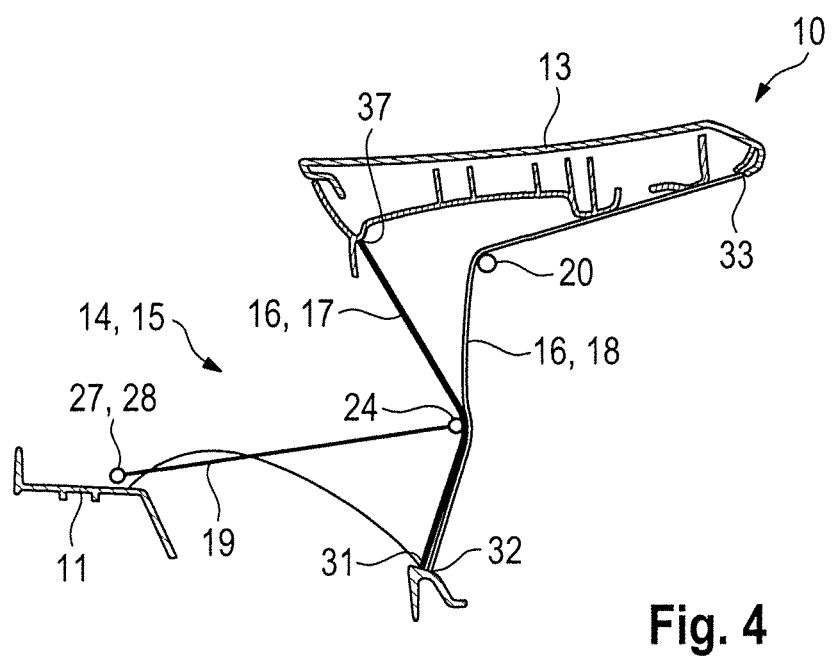
FIG. 4 is a cross section through the air-guiding device of FIG. 1 in a first, partially extended operating position.
Figure 5:
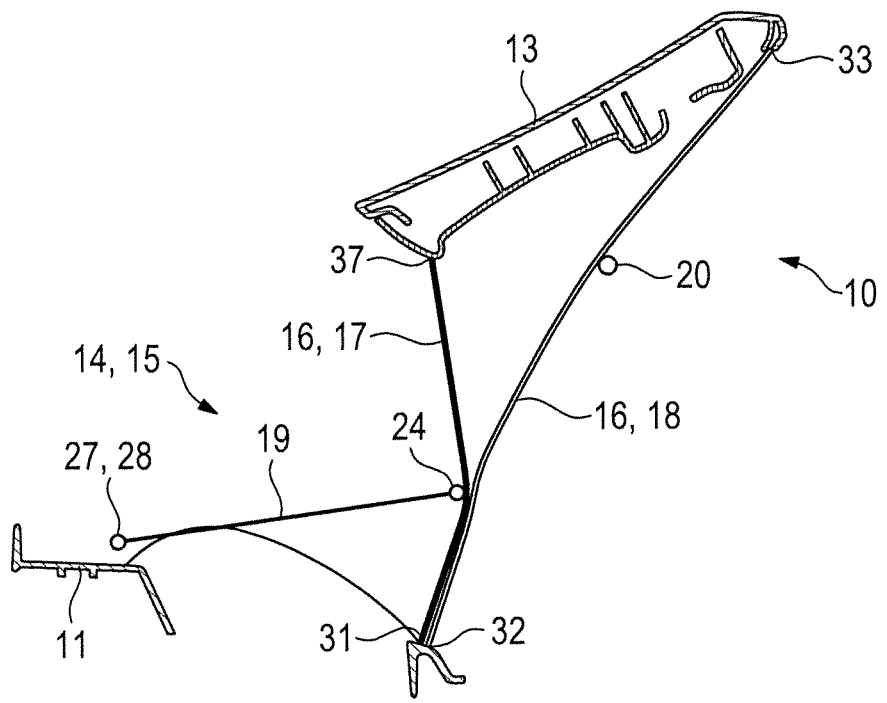
FIG. 5 is a cross section through the air-guiding device of FIG. 1 in a second, fully extended operating position.

The air-guiding device 10 has at least one air-guiding element 13. The illustrated embodiment shows only a single air-guiding element 13 that is shiftable from a retracted inoperative position into an extended operating position relative to the mounting element 11 that is mounted fixedly on the rear region of the vehicle. FIGS. 1, 2 and 5 show the air-guiding element 13 in a fully extended operating position of the air-guiding device 10. FIG. 4 shows the air-guiding element 13 in a partially extended operating position. It should be pointed out that there can be at least one further air-guiding element in addition to the one air-guiding element 13 shown. The air-guiding element 13 of the air-guiding device 10 is shiftable in relation to the mounting element 11 of the air-guiding device 10 between the extended operating position and the retracted inoperative position via a shifting device (not shown in detail). The shifting device can have, for example, a plurality of actuating rods that engage in an articulated manner on the mounting element 11 and on the air-guiding element 13. FIG. 1 shows covering elements 42 for covering subassemblies of the shifting device.

An interspace or gap 14 forms between the mounting element 11 and the air-guiding element 13 in the extended operating position and can be closed via a closure device 15.

The closure device 15 of the air-guiding device 10 functions to close the gap 14 that forms between the mounting element 11 and the or each air-guiding element 13 when the air-guiding device 10 is in the extended operating position. The closure device 15 is a multi-layered, flexible sheetlike structure 16 with at least one front outer, flexible layer 17 and a rear outer, flexible layer 18.

In the extended operating position, the front outer layer 17 of the flexible sheetlike structure 16 can be stretched with the aid of a stiff clamping element 19, whereas the rear outer layer 18 of the flexible sheetlike structure 16 can be stretched with a flexible clamping element 20.

The stiff clamping element 19 is a clamping bow 21 with two lateral limbs 22, 23 and a connecting limb 24 extending between the lateral limbs 22, 23. The clamping bow 21 has a substantially U-shaped contour. Free ends 25, 26 of the lateral limbs 22, 23 are connected in an articulated manner to the mounting element 11 via joints 27, 28. The connecting element 24 extending between the lateral limbs 22, 23 is connected to the front outer layer 17 of the flexible sheetlike structure 16.

The stiff clamping element 19 is pivoted about the joints 27, 28 when the air-guiding device 10 or the air-guiding element 13 is shifted into the extended operating position. As a result, the connecting limb 24 of the clamping bow 21 is raised and the connecting limb 24 stretches the front outer layer 17 of the flexible sheetlike structure 16. As explained above, the connecting element 24 of the stiff clamping element 19 is connected fixedly to the front outer layer 17 of the flexible sheetlike structure 16.

As shown in FIG. 1, the front outer layer 17 of the flexible sheetlike structure 16 extends exclusively between the covering elements 42, i.e. on the inside between the covering elements 42 and not laterally on the outside of the covering elements 13. On the contrary, stiff, plate-like closure elements 29 are positioned laterally on the outside next to the covering elements 13.

Two plate-like, stiff closure elements 29 are arranged laterally on the outside next to each covering element 13 and are connected to each other in an articulated manner via a joint 30. A first of the stiff closure elements 29 is connected in an articulated manner at an end opposite the joint 30 to the air-guiding element 13, and a second of said stiff closure elements 29 is connected in an articulated manner at an end opposite of the joint 30 to the mounting support 11. The fixed, plate-like closure elements 29 are pivoted about the joints when the air-guiding element 13 is shifted in relation to the mounting element 11.

Figure 3:
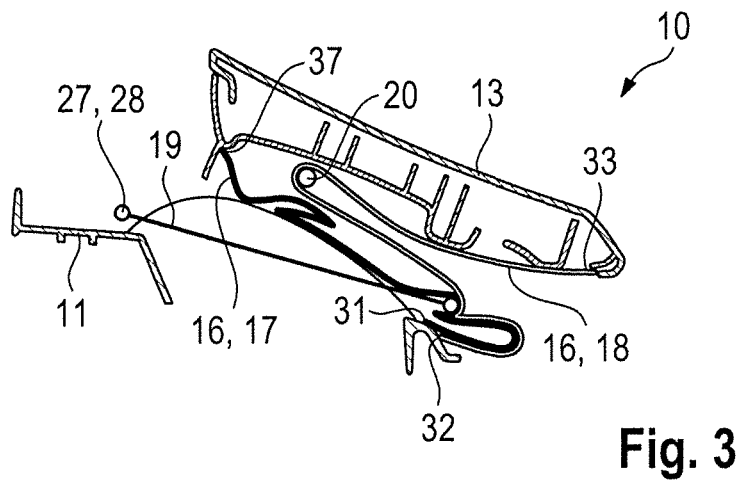
FIG. 3 is a cross section through the air-guiding device of FIG. 1 in the retracted inoperative position.

The front outer layer 17 of the flexible sheetlike structure 16 is connected fixedly in the region of a first border 31 that extends in the transverse direction to the mounting element 11 and in the region of an opposite border 37 that also extends in the transverse direction to the covering element 13, as shown FIGS. 3, 4 and 5. The front outer layer 17 of the flexible sheetlike structure 16 also is connected fixedly laterally to the covering elements 42.

As explained above, the flexible sheetlike structure 16 also comprises the rear outer, flexible layer 18 that can be stretched by a flexible clamping element 20 in the extended operating position. The flexible clamping element 20 may comprise at least one flexible clamping body made, for example, of fiber glass or another flexible material. The flexible clamping element 20 is connected fixedly to the rear outer layer 18 of the flexible sheetlike structure 16. However, the flexible clamping element 20 is freely movable in relation to the mounting support 11.

In contrast to the front outer layer 17 of the flexible sheetlike structure 16, the rear outer layer 18 extends over the entire transverse extent between the mounting element 11 and the air-guiding element 42, i.e., as seen in the transverse direction, over the region of the front outer layer 17 of the flexible sheetlike structure 16 and over the region of the stiff plate-like closure elements 29.

The rear outer layer 18 of the flexible sheetlike structure 16 is connected fixedly in the region of a first border 32 extending in the transverse direction to the mounting element 11 and in the region of an opposite border 33 likewise extending in the transverse direction to the air-guiding element 13. The rear outer layer 18 of the flexible sheetlike structure 16 also is connected at lateral borders 34 to the stiff closure elements 29. The flexible clamping element 20 engages on the stiff, plate-like closure elements 29 in the region of the joints 30.

Accordingly, the gap 14 that forms between the air-guiding element 13 and the mounting element 11 in the extended operating position is closed, as seen opposed to the direction of travel, by the front outer layer 17 of the flexible sheetlike structure 16 and by the stiff, plate-like closure elements 29. Thus, the front outer layer 17 of the flexible sheetlike structure 16 is arranged on the inside between the covering elements 13, and the stiff, plate-like closure elements 29 are arranged laterally on the outside next to the covering elements 13.

As seen in the direction of travel, the gap 14 that forms between the mounting element 11 and the air-guiding element 13 in the extended operating position is closed by the rear outer layer 18 of the flexible sheetlike structure 16 over the region of the front outer layer 17 of the sheetlike structure 16 and over the region of the stiff, plate-like closure elements 29.

The front outer layer 17 of the flexible sheetlike structure 16 is connected fixedly to the air-guiding element 13, to the mounting element 11 and preferably also to the covering elements 42. The stiff clamping element 19 is engaged in an articulated manner on the mounting element 11 and clamps the front outer layer 17 of the flexible sheetlike structure 16 in the extended operating position.

The rear outer layer 18 of the flexible sheetlike structure 16 is connected fixedly to the mounting element 11, the air-guiding element 13 and the stiff, plate-like closure elements 29. Thus, the flexible clamping element 20 stretches the rear outer layer 18 of the flexible sheetlike structure 16 in the extended operating position of the air-guiding device 10.

The stiff clamping element 19 functions to stretch the front outer layer 17 of the flexible sheetlike structure 16 and engages in an articulated manner on the mounting element 11 and also is connected fixedly to the front outer layer 17 of the flexible sheetlike structure 16. The flexible clamping element 20, on the other hand, functions to stretch the rear outer layer 18 of the flexible sheetlike structure 16 in the operating position of the air-guiding device 10, and is connected fixedly to the rear outer layer 18 of the flexible sheetlike structure 16 and to the plate-like, stiff closure elements 29 in the region of the joints 30.

The front outer layer 17 and the rear outer layer 18 of the flexible sheetlike structure 16 preferably are elastic. Thus, the front outer layer 17 and the rear outer layer 18 can be formed from an elastic knitted fabric that permits an elastic expansion of the layers 17, 18 to a defined extent.

As shown in FIG. 1, air passage openings 35 are formed in the mounting element 11 for supplying air to a radiator or a turbo charger. The air passage openings 35 are opened fully in the extended operating position. Spacers 36 are provided in the region of the air passage openings 35. Sections of the front outer layer 17 of the flexible sheetlike structure 16 bear on the spacers 36 in the retracted inoperative position. Thus, air can flow between the spacers 36, into gaps between the mounting element 11 and the sheetlike structure 16 and through the air passage openings 35 even in the retracted inoperative position of the air-guiding device 10.

Figure 6:
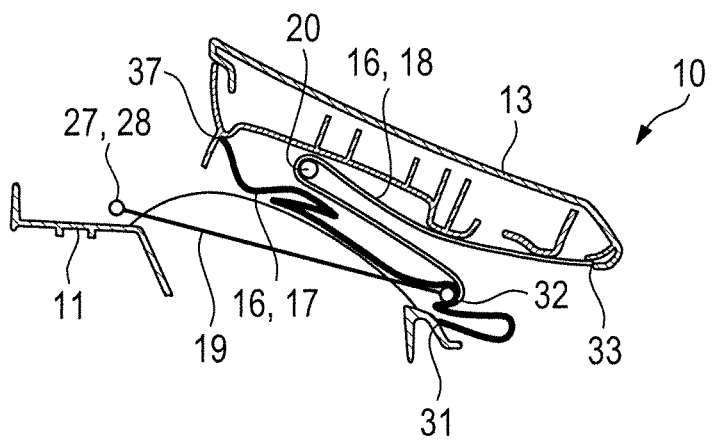
FIG. 6 is a cross section through an alternative air-guiding device in a retracted inoperative position.
Figure 7:
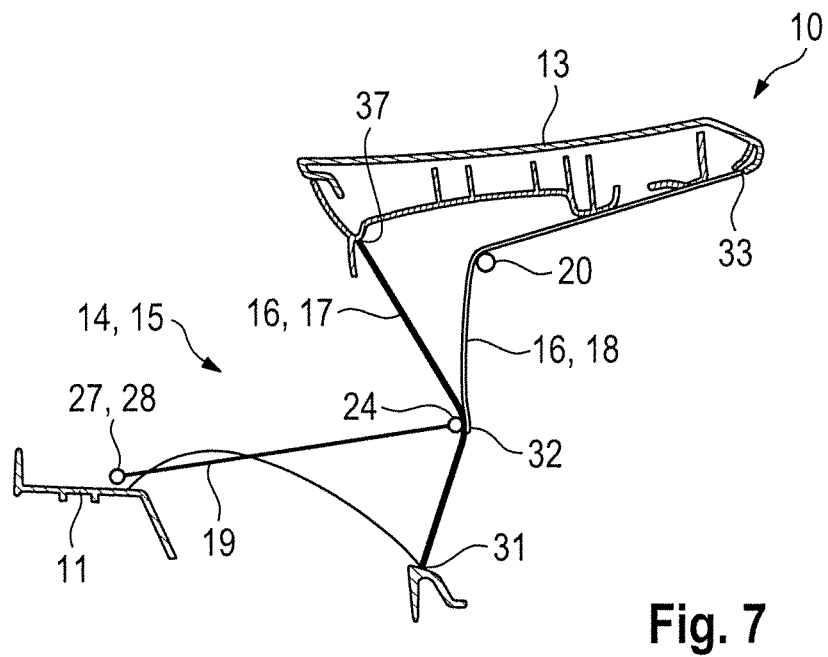
FIG. 7 is the air-guiding device from FIG. 6 in a first, partially extended operating position.
Figure 8:
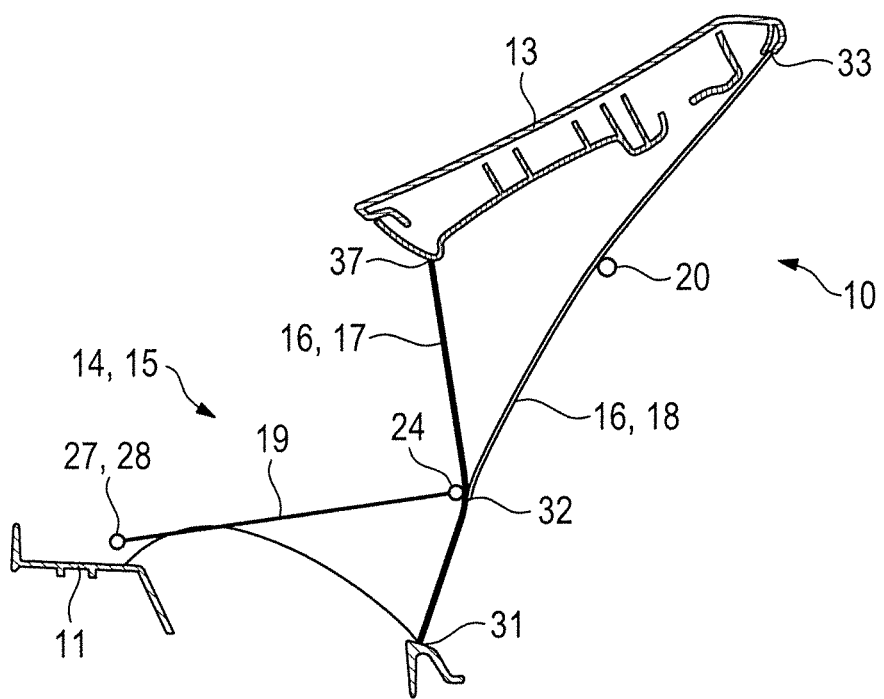
FIG. 8 is the air-guiding device from FIG. 6 in a second, fully extended operating position.

FIGS. 6 to 8 show an alternative configuration of an air-guiding device 10. The air-guiding device 10 of FIGS. 6 to 8 differs from the air-guiding device 10 of FIGS. 1 to 5 merely by the fastening of the rear outer layer 18 of the flexible sheetlike structure 16. Therefore the same reference numbers are used for identical subassemblies.

The rear outer layer 18 of the flexible sheetlike structure 16 of FIGS. 6 to 8 is not connected to the mounting element 11 in the region of the first transverse border 32, but rather is connected to the front outer layer 17 of the flexible sheetlike structure 16, in the region where the connecting limb 24 of the stiff clamping element 19 is connected to the front outer layer 17. The opposite transverse border 33 of the rear outer layer 18 of the flexible sheetlike structure 16 is connected fixedly to the air-guiding element 13 and also is connected at lateral borders 34 to the stiff closure elements 29. With regard to all of the remaining details, the variant in FIGS. 6 to 8 corresponds to the variant in FIGS. 1 to 5, and therefore reference is made to the explanations regarding the variant in FIGS. 1 to 5.

What is claimed is:

1. An air-guiding device for a rear region of a vehicle with at least one air-guiding element that is shiftable between a retracted inoperative position and an extended operating position, a gap being forming between the air-guiding element and the mounting element when the air-guiding element is in the extended operating position, and a closure device for closing the gap, the closure device, comprising:
a multi-layered, flexible sheetlike structure having at least one front outer flexible layer and a rear outer flexible layer; a stiff clamping element disposed and configured for stretching the front outer flexible layer when the air-guiding element is in the extended operating position; and a flexible clamping element that stretches the rear outer flexible layer when the air-guiding element is in the extended operating position.

2. The air-guiding device of claim 1, wherein the stiff clamping element is a clamping bow, with lateral limbs and a connecting limb extending between the lateral limbs, the lateral limbs of the clamping bow having free ends articulated on the mounting element, and the connecting limb being connected to the front outer flexible layer.

3. The air-guiding device of claim 2, wherein the front outer flexible layer is connected to the air-guiding element and to the mounting element.

4. The air-guiding device of claim 1, wherein the flexible clamping element is connected to the rear outer flexible layer.

5. The air-guiding device of claim 1, wherein the rear outer flexible layer is connected to the air-guiding element.

6. The air-guiding device of claim 5, wherein the rear outer flexible layer further is connected to the mounting element or to the front outer flexible layer.

7. The air-guiding device of claim 1, wherein the front outer flexible layer extends transversely between covering elements for subassemblies of a shifting device of the air-guiding element, and the closure device further having stiff closure elements positioned laterally on the outside next to the covering elements.

8. The air-guiding device of claim 7, wherein each of the stiff closure elements has first and second stiff closure plates articulated to each other and positioned laterally outside the respective covering element, the first closure plate being articulated to the mounting element and the second closure plate being articulated to the air-guiding element.

9. The air-guiding device of claim 7, wherein the rear outer flexible layer extends transversely over the region of the stiff closure elements.

10. The air-guiding device of claim 9, wherein the rear outer flexible layer is connected to the stiff closure elements.

11. The air-guiding device of claim 1, wherein the front outer flexible layer and the rear outer flexible layer are elastic.

12. The air-guiding device of claim 11, wherein the front outer flexible layer and the rear outer flexible layer are formed from an elastic knitted fabric.

13. The air-guiding device of claim 1, wherein the mounting element has air-passage openings and spacers positioned in proximity to the air passage openings, wherein, in the retracted inoperative position, the front outer flexible layer bears against the spacers, with a defined gap being formed between the front outer flexible layer and the air passage openings.

* * * * *